(12) United States Patent
Hofbauer

(10) Patent No.: US 7,298,468 B2
(45) Date of Patent: Nov. 20, 2007

(54) METHOD AND MEASURING DEVICE FOR CONTACTLESS MEASUREMENT OF ANGLES OR ANGLE CHANGES ON OBJECTS

(76) Inventor: Engelbert Hofbauer, Bodenseestr, 12, Munich (DE) 81241

( * ) Notice: Subject to any disclaimer, the term of this patent is extended or adjusted under 35 U.S.C. 154(b) by 19 days.

(21) Appl. No.: 11/312,257

(22) Filed: Dec. 20, 2005

(65) Prior Publication Data
US 2006/0164630 A1  Jul. 27, 2006

Related U.S. Application Data

(63) Continuation of application No. PCT/DE2004/001293, filed on Jun. 21, 2004.

(30) Foreign Application Priority Data
Jun. 20, 2003  (DE) .............................. 103 27 939

(51) Int. Cl.
*G01B 11/26* (2006.01)
(52) U.S. Cl. ...................... 356/154; 356/155
(58) Field of Classification Search ................ 356/138, 356/139.09, 139.1, 141.2, 154, 155
See application file for complete search history.

(56) References Cited

U.S. PATENT DOCUMENTS

| | | | | |
|---|---|---|---|---|
| 4,931,640 A | * | 6/1990 | Marshall et al. ............ 250/291 |
| 5,218,415 A | * | 6/1993 | Kawashima ............. 356/139.1 |
| 5,513,000 A | | 4/1996 | Smith et al. |
| 5,883,709 A | | 3/1999 | Okuda et al. |
| 6,043,892 A | * | 3/2000 | Park ........................... 356/400 |
| 6,046,799 A | * | 4/2000 | Lysen ...................... 356/139.1 |

FOREIGN PATENT DOCUMENTS

DE  197 41 290 A1  4/1998

\* cited by examiner

*Primary Examiner*—Tarifur Chowdhury
*Assistant Examiner*—Tara S Pajoohi
(74) *Attorney, Agent, or Firm*—Lerner, David, Littenberg, Krumholz & Mentlik, LLP

(57) ABSTRACT

The invention relates to a method for the contactless measurement of angles or angle modifications, distances or lateral displacements in objects. According to said method, an aperture is transilluminated by means of a ray bundle and after being reflected by a distant reflective element, which generates or is subjected to the angles, angle modifications or lateral displacements that are to be measured, is projected onto a detector surface by an optical system. The image of the aperture on the detector surface is captured, the position of the aperture image is determined in relation to a reference point on the detector surface and the measured value of the angle modification or lateral displacement is calculated using the distance of the centre of the image from the reference point. The invention also relates to an angle or height measuring device.

37 Claims, 4 Drawing Sheets

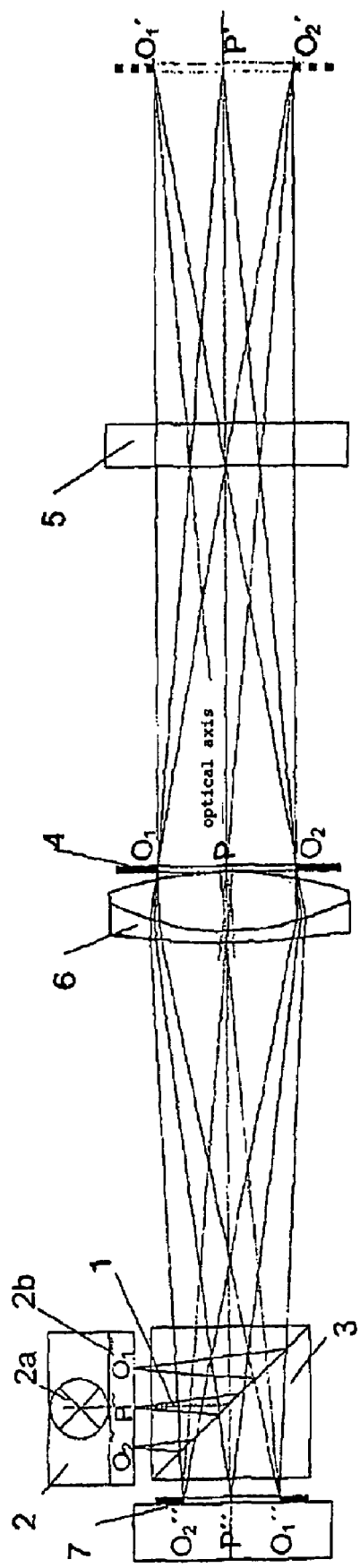
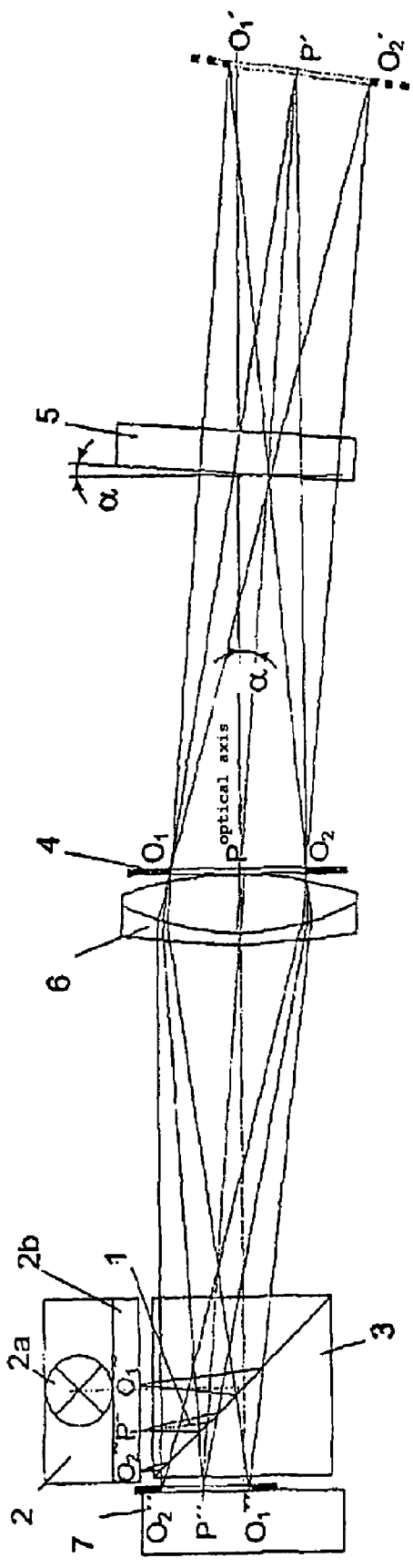
Fig. 4
Fig. 5

METHOD AND MEASURING DEVICE FOR CONTACTLESS MEASUREMENT OF ANGLES OR ANGLE CHANGES ON OBJECTS

CROSS-REFERENCE TO RELATED APPLICATIONS

This application is a continuation application of the international patent application Serial No. PCT/DE2004/001293 filed Jun. 21, 2004, the disclosure of which is hereby incorporated herein by reference.

BACKGROUND OF THE INVENTION

The present invention relates to a method and a device for measuring angles or angle changes on objects.

Measuring systems according to the reflection method, which are used for measuring camber and toe of motor vehicles, are known from Patent Specifications CH 454 477, CH 451 532, and DE 2759 556 C2. In this case, a measuring scale is imaged using a projector over the reflecting surface, which is subjected to the angle change, on a matte disk and/or on a matte disk having optoelectronic converters. The disadvantage in this method is the required fixed reference distance between measuring device and mirror in order to obtain a sharp image on the matte disk, which must be read manually and may not be automated easily. In addition, a special, complex, and costly receiver having the optoelectronic converters and special analysis electronics is necessary for automatic ascertainment of the measured values due to the relatively great enlargement of the image. Furthermore, the number and size (packing density) of the optoelectronic converters are limited, so that the resolution and measuring range are too low for most applications.

Furthermore, determining angles or angle changes in a contactless way with the aid of an autocollimation telescope, in which a suitable projected object (typically crosshairs) is evaluated after reflection on a reflecting surface subjected to the angle change with the aid of a beam splitter and an objective acting as the collimator and telescope, is generally known in principle. Corresponding embodiments are known in, among other things, DE 33 11 945 A1, DE 197 41 290 A1, and U.S. Pat. No. 5,513,000. Instead of crosshairs, a pin diaphragm is positioned as the object in DE 197 41 290 A1. A disadvantage in these arrangements is that with increasing measurement distance, i.e., as the distance becomes greater between mirror and autocollimator, the angle measurement range is reduced because of shadowing through screen effects. The problem is known and/or described in U.S. Pat. No. 5,513,000. The autocollimator contains two switchable light sources therein, which are laterally offset within the object plane and thus allow two small measuring ranges. The problem in this case is that continuous measurement within a large measuring range is not possible. Furthermore, a system having collimator and telescope at an acute angle, in which a punctual light source functions as the object generator, is known from U.S. Pat. No. 5,883,709. However, this system also functions for large angles up to 30° only at very small distances between test object and receiver system, since the lens opening of the receiver collimator also vignettes and also does not solve the problems described above.

SUMMARY OF THE INVENTION

Amongst other things, it may be an object of the invention to provide a method and/or an associated measuring device whose angle measuring range is greater than that of typical methods, a sufficient angle measuring range to be provided even at larger distances between measuring object and measuring arrangement, which provides linearly proportional measured values even in the event of different measurement distances. In addition, the analysis is to be able to be performed automatically.

This technical object may be achieved according to the present invention by a method or device.

In accordance with one aspect of the invention, a method for contactless measurement of angles or angle changes on objects may comprise generating a beam bundle; transilluminating a screen using the beam bundle, the screen acting simultaneously as an aperture screen and a field screen and having an adjustable or variable screen opening in order to allow adaptation of the size of the screen image on a detector corresponding to a predefined measurement distance; imaging the transilluminated screen through an optical system on the detector surface after reflection on a distal reflecting element which is subjected to the angle changes to be measured; detecting the image of the screen on the detector surface; ascertaining the position of the screen image in relation to a reference position of the original screen image or to a reference point on the detector surface; and determining the measured value of the angle change a on the basis of the position displacement to the reference position and to the reference point respectively.

The beam bundle may be generated using a light generator from the group consisting of planar radiator and light having corresponding beam density distributions or display illuminations having adjustable absorption patterns in the illumination plane in order to generate characteristic light density distributions.

A quasi-parallel or approximately quasi-parallel beam bundle may be used in the step of transillumination.

Transillumination of the screen may be performed by an additional optical system. The additional optical system may be positioned at an angle φ to the optical system.

In the step of imaging the screen, a telecentric beam path may be used.

The reflecting element may have a suitable diffraction structure. The diffraction structure may diffract in one dimension and direction respectively. The diffraction structure may diffract in two directions. The diffraction structure may have different grating constants in the two directions and therefore may produce different angles of diffraction in the two directions.

The screen may be designed in such a way that it has at least two openings positioned in a suitable way, whose geometry is known and which allow exact determination of the screen image size on the detector. The imaging scale may be determined via the determination of the screen image size and wherein the focal intercept and the measurement distance respectively may be determined via the known focal width of the optical system. The reflecting element may be implemented as a retroreflector. The retroreflector may be an optical square which is inclination-invariant in only one plane. The retroreflector may be a triple mirror or corner cube which is inclination-invariant in two planes.

Lateral displacements may be measured via the angle measurement and the distance ascertained between the reflector and a device via the tangential relationship.

In accordance with a further aspect of the present invention, a measuring device for contactless measurement of angles or angle changes on objects may comprise a light generator adapted to generate characteristic light density distributions and produce a beam bundle; a downstream screen, which is transilluminated by the beam bundle and acts simultaneously as an aperture screen and a field screen and has an adjustable or variable screen opening in order to allow adaptation of the size of the screen image on a detector in accordance with the predefined measurement distance; a reflecting element downstream at a predefined measurement distance, which is subjected to the angle change α to be measured; an optical system, which generates the screen image from the reflected beam bundle; an optoelectronic detector, on which the screen image is projected; and, a downstream electronic analysis unit, the analysis unit being set up to determine the distance of the position of the screen image from a prior reference position and from a reference point respectively, in order to obtain therefrom the measured value of the angle and the angle change respectively.

The light generator may be selected from the group of light generators consisting of a planar radiator having corresponding beam density distributions and display illuminations having adjustable absorption patterns in the illumination plane. To determine the position of the screen image, the analysis unit may automatically ascertain the center point or the edge of the screen image on the basis of its brightness distribution. To determine the position of the screen image, the analysis unit may automatically ascertain the center point of the screen image on the basis of its centroid.

The optical system may be adjustable in the direction of the optical axis in order to focus the screen image on the detector.

The detector may be adjustable in the direction of the optical axis in order to focus the screen image on the detector.

The screen, the optical system, the reflecting element, and the detector may be positioned on one axis and a beam splitter may be positioned on this axis between the screen and the detector and the radiation source may emit the radiation bundle for illuminating the screen into the beam splitter transversely to this axis.

A monochromatic light source may be provided as the radiation source.

A filter element may be provided in the beam path, which filters out the interfering light from the surroundings.

The planar radiator may be a light source having a light-scattering element. The light-scattering element may be implemented as a scattering disk, diffuser, or opal disk.

The reflecting element may have a suitable diffraction structure. The diffraction structure may diffract in one dimension and direction respectively. The diffraction structure may diffract in two directions. The diffraction structure may have different grating constants in the two directions and therefore may produce different angles of diffraction in the two directions.

The screen may be designed in such a way that it has two or more openings positioned in a suitable way, whose geometries are known and which allow exact determination of the screen image size on the detector. The imaging scale may be ascertained via the determination of the screen image size and wherein the focal intercept and the measurement distance respectively may be determined via the known focal width of the optical system.

The reflecting element may be implemented as a retroreflector. The retroreflector may be an optical square which is inclination-invariant in only one plane. The retroreflector may be a triple mirror or corner cube, which is inclination-invariant in two planes. Lateral displacements may be measured via the angle measurement and the distance ascertained between reflector and device via the tangential relationship.

BRIEF DESCRIPTION OF THE DRAWINGS

In the following, exemplary embodiments of the present invention are explained in greater detail on the basis of the attached drawing in which:

FIG. 4 shows the beam path upon imaging of the screen at an angle α=0° to the reflecting surface;

FIG. 5 shows the beam path upon imaging of the screen at an angle α≠0° to the reflecting surface;

DETAILED DESCRIPTION

Figure 1:
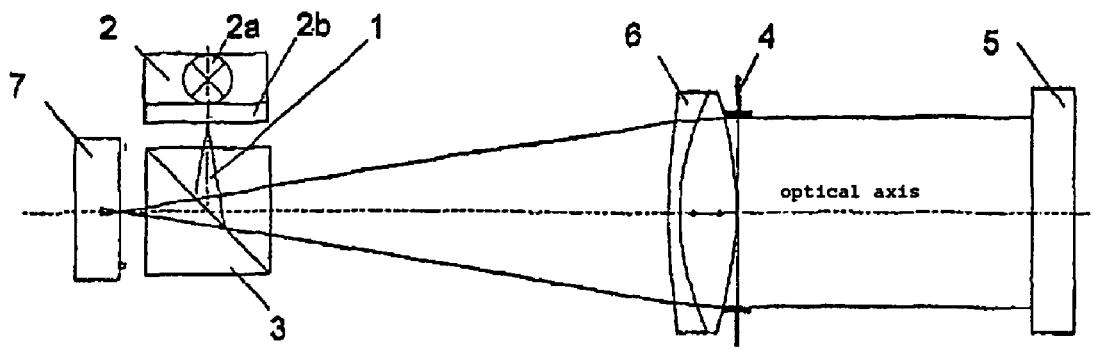
FIG. 1 shows a schematic view of a first exemplary embodiment of the measuring device according to the present invention.

In the method according to the present invention, a beam bundle is used which originates from a homogeneously illuminated planar radiation field and transilluminates the screen uniformly. Optical, incoherent radiation may be used as the radiation, visible, monochromatic light between 400 and 780 nm in the exemplary embodiment, IR, UV, and the entire further range of the electromagnetic spectrum from gamma radiation via x-ray radiation up to microwave radiation also being conceivable. Furthermore, monochromatic and/or coherent or partially coherent radiation sources are also conceivable.

The screen is subsequently first imaged on a reflecting surface subjected to the angle change at the imaging scale 1 and subsequently the virtual image of the screen arising at double the distance from screen to reflecting surface is imaged via the optical system on a detector surface.

The present invention is based on the idea of analyzing a lateral screen image displacement on a detector which is proportional to the angle change of the reflecting element and determining the precise absolute value and the direction (sign) in relation to a prior position or a reference position (null position).

In this type of analysis according to the present invention, the vignetting through finite limited lens openings, which is problematic in normal autocollimation methods, may be used, and precisely this vignetting screen may be imaged and/or analyzed. In this case, the beam bundles contributing to the image of the screen are used, which encloses the beam bundle containing the main beam, which is incident exactly perpendicularly on the reflecting surface subjected to the angle change, in an angularly symmetric way.

The beam bundles which contribute to the imaging of the screen but are not incident perpendicularly on the mirror also contain main beams which enclose the perpendicular main beam in a rotationally symmetric/angularly symmetric way, in each case by the angle corresponding to the imaged screen size.

In this case, practically all beams contributing to the imaging of the screen pass through the imaging optical system again, independently of the measurement distance, so that no light losses occur.

Those quasi-parallel beam bundles whose main beams have an angle to the actual, perpendicular main beam greater than the angle corresponding to the imaged screen size do not pass through and/or no longer pass through the optical system and do not contribute to the imaging.

The beam bundles described originate from neighboring light points within the planar splitter, which enclose the light point lying on the perpendicular main beam in a point-symmetric way.

A circular screen may be used as the screen shape, other shapes such as elliptical, square, rectangular, or other arbitrary geometric shapes also being conceivable, however.

The screen diameter and the minimum distance between screen and reflecting surface may be tailored to one another, so that the measuring range and resolution may be optimized.

The reflecting element may be implemented as a mirror, but other surfaces which sufficiently reflect the beam bundle, such as uncoated glass surfaces or surfaces of liquids, are also possible. The test object itself may also act as a reflecting element. This may be the case, for example, in the testing of the surface geometry of optical lens surfaces, optical mirrors, silicon wafer disks, or other surfaces reflecting the radiation, as in the testing of the angle and angular deviation of optical flats and wedges, prisms, and optical squares of different constructions.

The reflecting element is expediently implemented as a planar mirror, which is subjected to a specific flatness requirement in accordance with the required measurement precision and/or permissible measurement uncertainty. However, other mirror geometries are also conceivable.

Furthermore, an element which has a correspondingly structured surface as a diffraction grating, for example, may be used as the reflecting element. The diffraction angles are given for a fixed grating according to the grating constants and the wavelength of the radiation. Corresponding integral multiples of the diffraction angle are reflected in each case for the different orders of diffraction, which may be partially detected by the device within its measurement range. Arbitrary gratings having greatly varying glancing and diffraction angles are conceivable. In a exemplary embodiment, the diffraction grating is designed in such a way that the diffraction angle of the grating is just slightly smaller than the single, entire measurement range of the device (having a normal reflector and/or planar mirror; without diffraction grating). In the limiting range, i.e., in the event of an angle change of the reflector beyond the limits of the measuring range, before leaving the radiation surface of the corresponding order of diffraction, the beam bundle of the next order of diffraction is imaged on the detector and detected as an angle measured value. Upon the transition from one detected order of diffraction to the next, the detector will typically detect 2 measured points. The difference ascertained and/or the distance of the two measured points is taken into consideration as the offset in the analysis.

Therefore, for example, the double, triple, and further integral multiples of the original angle value may also be detected with the precision and resolution remaining uniform. The grating is typically applied to a planar glass surface. However, geometries other than planar geometries are also possible. In addition, further materials such as plastics, metals, and other materials are also conceivable.

The detector which detects the image of the screen may be implemented as an optoelectronic receiver such as a quadrant diode, a position-sensitive lateral effect diode (PSD), or a CCD line and/or preferably a CCD area sensor, automatic analysis able to be performed using a downstream analysis electronics system or a PC.

Furthermore, the position of the screen image may also be analyzed visually via an ocular having corresponding aids such as ocular measuring marks or an ocular micrometer.

In another exemplary embodiment of the method, in the step of transillumination, a quasi-parallel or approximately quasi-parallel beam bundle is used. This may make possible that practically all beams which contribute to the imaging of the screen are reflected parallel from the planar mirror again and all beams pass through the screen into the optical system, so that no light losses and, above all, no light strength changes occur on the detector at different measurement distances (between screen and mirror and/or mirror and optical system).

The quasi-parallel or approximately quasi-parallel beam bundle is generated by a radiation source in the object-side focal point and/or in proximity to the focal point of the optical system, the beams coming from a finite area of an optical system enclosing the focal point within the focal plane and/or being generated in such a way that they appear to come from this area.

In an advantageous practical embodiment, a single optical system having a beam splitter between the illumination and/or detector and optical system is used. The optical system simultaneously assumes the function of the transillumination of the screen with quasi-parallel radiation and the function of imaging the screen on the detector. In this type of arrangement, the illuminated screen is simultaneously the aperture screen of the imaging system.

Alternatively, a divided 2-part optical system may also be used, in which two optical systems are positioned at an angle $0°<\phi<90°$ or an angle $\phi=90°$ to an additional beam splitter between the first optical system and the reflecting element.

In a further exemplary embodiment of the present invention, the screen may be positioned in the image-side focal point of the optic in order to obtain a telecentric beam path during the step of imaging, which may be useful if different image distances result through different measurement distances, which may not or are not to be refocused.

The measuring device for contactless measurement of angles or angle changes on an object contains a radiation source for generating a beam bundle, a downstream screen which is transilluminated by the beam bundle, a downstream reflecting element at a predefined measurement distance, which is subjected to the angle change to be measured, an optical system which generates the screen image from the beam bundle reflected back, an optoelectronic detector on which the screen image is projected, and a downstream electronic analysis unit, the analysis unit being set up to determine the position of the screen image to a prior reference position and to a reference point respectively, in order to obtain therefrom the measured value of the angle and the angle change respectively.

In another embodiment, the analysis unit is set up in such a way that it automatically ascertains the center point of the screen image on the basis of its brightness distribution. However, the edges of the screen image may also be ascertained and analyzed in the same way.

In a variation of the analysis unit, the center point of the screen image may also be ascertained automatically on the basis of its centroid.

For certain applications, for example, at small distances and/or with long objective focal widths (for extremely high resolutions and precisions), it has been shown to be possible for the screen to have a variable screen opening in order to allow adaptation of the size of the screen image on the detector corresponding to the predefined measurement distance.

In a special variation, the optical system may be adjustable in the direction of the optical axis in order to focus the screen image on the detector. In this case, the contrast and/or the transition of the intensity curve between the bright and dark components of the screen image may be adapted to correspond to the requirements, fuzzy images also able to be useful in some cases. Instead of the displacement of the optical system, the detector may also be positioned displaceably in order to focus the screen image, of course.

In another embodiment, the screen, the optical system, the reflecting element, and the detector may be positioned on one axis, for a beam splitter to be positioned on this axis between screen and detector, and for the radiation source to emit the beam bundle for illuminating the screen into the beam splitter transversely to this axis. A simple, compact, and cost-effective construction may be implemented in this way, in which the illumination of the screen and its imaging may be performed using a single optical element and/or system.

In another variation of the present invention, it has resulted that a monochromatic light source is provided as the radiation source.

In addition, a filter element may be provided in the beam path which filters out the interference radiation from the surroundings. It is may be favorable in this case if the monochromatic radiation of the radiation source is transmitted well by the filter provided, which filters out the interfering light of the environment.

Another embodiment of the measuring device has a light-scattering element in the beam path between radiation source and screen. This light-scattering element may be implemented as a scattering disk, diffuser, and/or opal disk and allows a corresponding design of the light density distribution of the planar radiator.

Otherwise, planar radiators or lights having corresponding light density distributions or display illuminations having absorption patterns which may be generated are also conceivable in the illumination plane in order to compensate for specific properties (e.g., the distortion of an objective) or to generate specific characteristics.

Furthermore, instead of subjecting the reflecting surface to the angle changes to be measured, the method may also be used in the reverse sense, in that the measuring device is subjected to the angle changes to be measured in relation to the fixed reflecting surface. For example, the measuring device may be used in order to measure large, heavy mirrors, glass blocks, or liquid surfaces in such a way that the measuring device is pivoted and/or slanted exactly around one or even two orthogonal axes and the measured angle change is related to the angular inclination introduced, the difference is calculated, and the formal deviation may be determined.

In a further application, the reflecting element may be an optical element comprising at least two optical surfaces, which are known as optical flats and wedges, prisms, or optical squares, for example. In this case, an image of the screen is imaged on the detector by both reflecting surfaces and the distance of the image points is ascertained as the angular difference, taking the refractive index and/or corresponding factors into consideration. Optical wedges having up to 40° refractive index may thus typically be ascertained. In addition, optical squares or prisms having deflection angles of 180° minus maximum angle measuring range $\alpha_{max}$ of the arrangement and/or the angular deviations of prisms 90°-$\alpha_{max}$ and, with a corresponding arrangement, also deviations of 45°-optical squares may be ascertained.

In a further exemplary application, optical wedges and prism surfaces—when the surfaces have been well coated with an antireflection material, for example—may also be measured in transmission against a planar mirror. In this case, the test object is laid laterally from the optical axis on a mirror or laid on a holding device between mirror and measuring system. The two beam bundles which are incident perpendicularly on the mirror (a) direct beam bundle from the measurement arrangement b) beam bundle deflected by the test object) are imaged and generate a "double point" on the detector, whose distance is analyzed and results in the angle measured value.

In a further embodiment, a suitable "multiple prism" having appropriately stepped wedge sectors may also be used in this way, so that a simple pupil division is possible, using which test objects such as lenses and optical systems may be checked and measured with the aid of a mirror or with the aid of a CCD camera in a telescope arrangement for wave front quality in transmission or for coating dimensions.

In addition, a double image made of two fixed, illuminated area sections at an angle $\alpha$ to one another may be generated and analyzed on an optical lens or mirrors surface having weak curvature. By changing the measurement distance, the surface inclination angle as a function of the distance and therefore to the sampling diameter on the reflecting surface may be determined. After a subsequent computing operation, the surface geometry may be determined. Simultaneously, the deviation of the two screen images to the fixed reference point may be analyzed as a centering error in this method. With strongly curved optical surfaces, preferably aspheric surfaces, these may also be analyzed with the aid of upstream (focusing) optics.

Furthermore, the system may also be used to the leveling over water in an air or water vehicle by orienting the device perpendicularly to the water surface and determining the angular position to a reference point and/or to a reference axis.

In specific cases, it may be necessary or favorable to determine the measured distance between measuring device and reflecting element. For this purpose, the imaging scale may be calculated via the known size of the screen and the size of the screen image, and thus the distance may be calculated if the focal width of the optical system is known.

In a special application of the arrangement as a measuring method, a single-axis optical square or a double-axis retroreflector may be used as the reflecting element. Optical squares and/or retroreflectors (triple mirrors and/or corner cubes) have the property of reflecting incident beam bundles one-dimensionally and/or two-dimensionally in the direction from which they came. With the aid of such an element, it is thus possible to detect corresponding beam bundles in such a way that the tilting (for one-dimensional optical squares) does not result or not only the tilting results in an angle or an angle change ascertained on the detector, but rather a lateral displacement of the element.

For example, with a known focal intercept s (equal to the distance between measuring device and reflecting element=measurement distance), the desired value for a lateral displacement x and/or delta x may be calculated from this measured angle via a tangent function.

Using the present invention, automatic alignment measurements may be performed according to the height method. In most cases of the application according to the present invention, the distances may be fixed sufficiently precisely or determined in another way.

However, it is also possible to determine the measured distance s between measuring device and reflecting element in such a way that the imaging scale is ascertained via the known size of the screen and the size of the screen image measured on the detector. The distance s may be determined via the known focal width of the optical system and the imaging scale.

In another embodiment, the screen is not circular and/or single-surface, but rather divided in two by a web in the middle, for example, so that one light point does not result as the image on the detector, but rather two crescent-shaped areas. The advantage in this case is that the rising and falling slopes do not provide the image diameter, which results in, among other things, faulty determination of the imaging scale in the event of critical conditions such as saturation of the detector, but rather this diameter may be determined exactly via the center points and/or centroids of the crescent areas. Of course, other screen geometries are also conceivable in addition, such as those having square or rectangular boundaries and webs or having 2 circular screen openings. The screens may additionally be divided not only into two parts, but rather also into multiple parts, if they permit a corresponding imaging through the retroreflectors described.

FIG. 1 shows a preferred example of the device according to the present invention, the beam bundle 1 entering the overall optical system via a beam splitter 3 after originating from a radiation source 2, being deflected by 90°, and transilluminating the screen 4. On the reflecting element 5, which is subjected to the angle changes and which is preferably implemented as a planar mirror, the beam bundle per se is reflected and imaged on the detector 7 via the optical system 6 after passing through the beam splitter 3 again.

Figure 2:
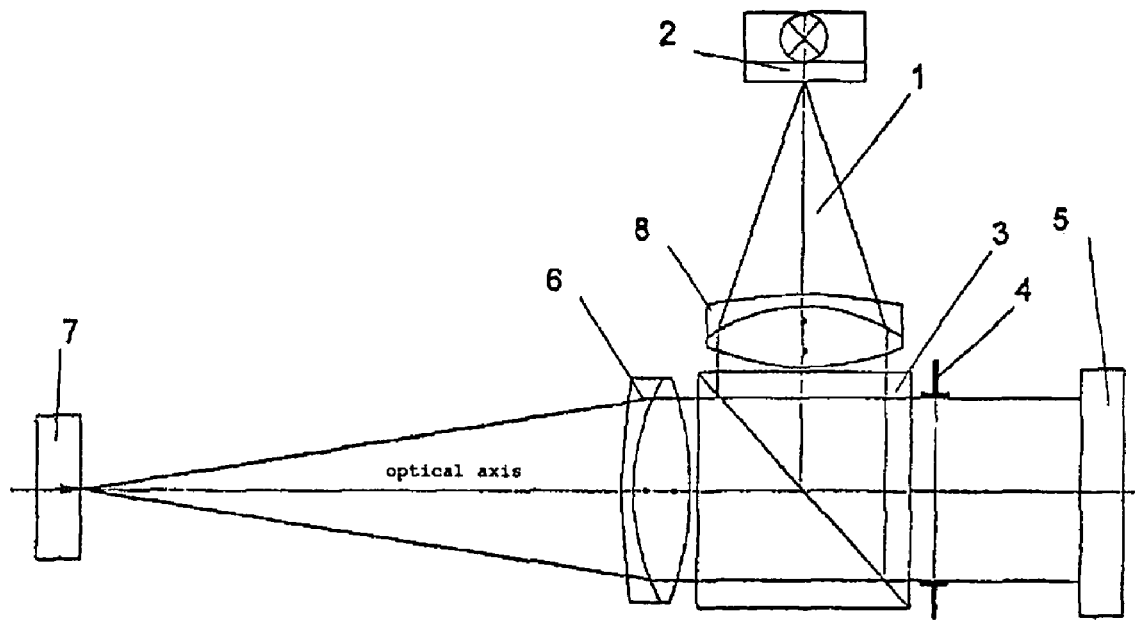
FIG. 2 shows a second exemplary embodiment of the measuring device according to the present invention.

A second exemplary embodiment is shown in FIG. 2, in which the beam splitter 3 is seated essentially in the quasi-parallel beam path instead of in the divergent beam path. The screen 4 is positioned between beam splitter 3 and mirror 5, it also being able to be positioned between a further optical system 8 and the beam splitter. In the first case, the screen is then typically a field screen and aperture screen at the same time. In the second case, it is only a field screen.

Figure 3:
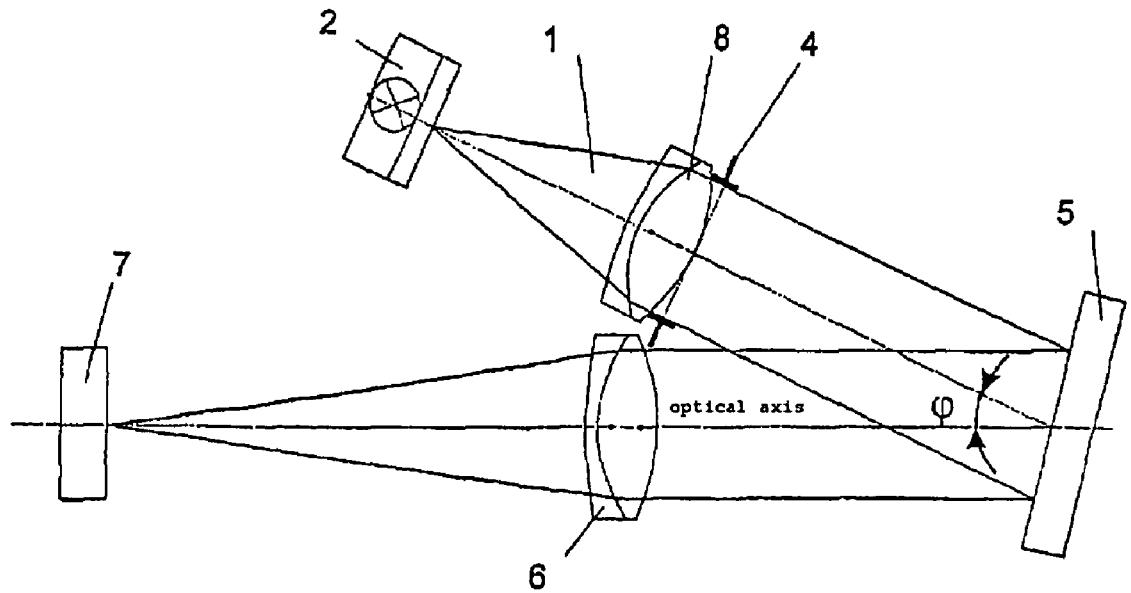
FIG. 3 shows a third exemplary embodiment of the measuring device according to the present invention.

A third exemplary embodiment is shown in FIG. 3, in which the optical system 6 and a further optical system 8 are positioned at an angle φ and the screen 4 functions purely as a field screen.

In FIG. 4, the beam bundle 1 is schematically shown originating from a point P''' on the light surface 2b illuminated by a radiation source 2a, which contributes to the imaging of the point P of the screen in the image point P''' if mirror surface 5 is perpendicular. The neighboring light points $O_1$''' and $O_2$''' (edge of the entrance pupil) on the lighted surface 2b contribute for this purpose to the screen edge ($O_1$ and/or $O_1$' and $O_2$ and/or $O_2$') being imaged in the screen edge image points $O_1$''' and/or $O_2$''' (edge of the exit pupil) on the detector 7. The intensity of the brightness distribution within the screen image on the detector is determined by the totality of the neighboring points in their light density on the light field. These points lie rotationally symmetrically around the point P1''', between the points P''' and $O_n$''' (with $1 < n < \infty$) and are imaged in the screen image plane.

FIG. 5 schematically shows the beam path when mirror surface 5 is inclined by the angle α. The main beam originating from point P and/or P' is perpendicular to the mirror surface 5 and also encloses the angle α to the optical axis. The image of the screen (exit pupil) is laterally displaced in this case within the image plane and/or detector plane 7. The light field within the light surface 2b contributing to this image, the entrance pupil, is also laterally displaced.

Figure 6:
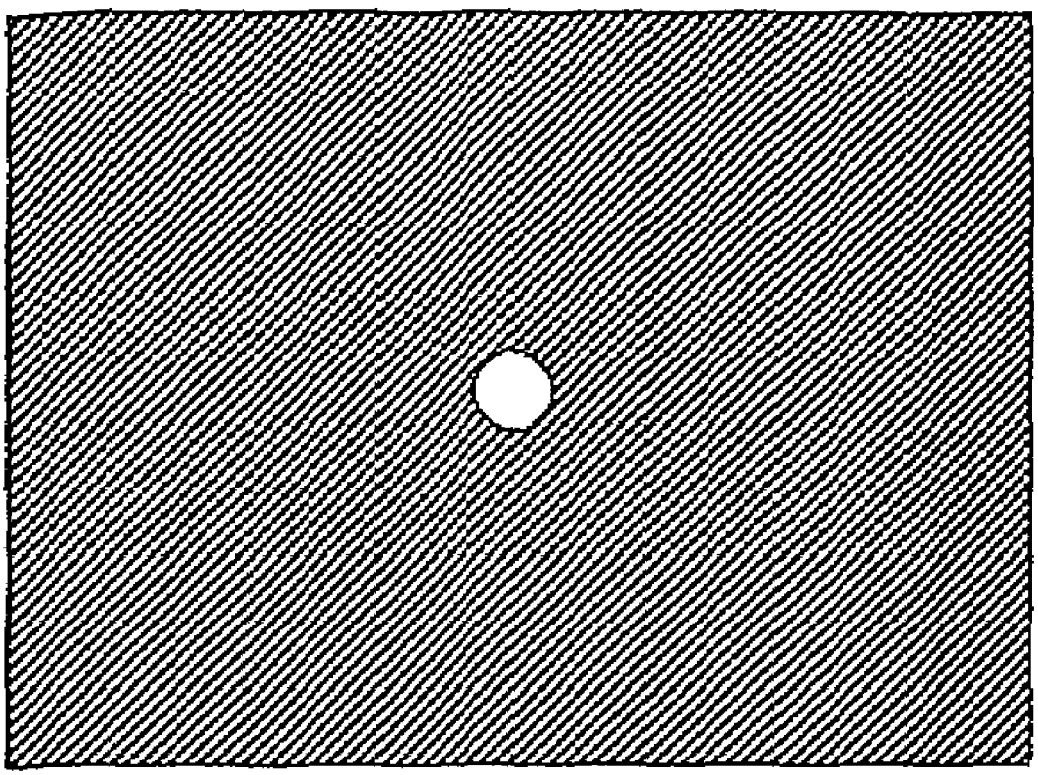
FIG. 6 shows the image of the screen position at an angle α=0° to the reflecting surface viewed from the detector.

FIG. 6 schematically shows the example of the screen image on the detector when the mirror is perpendicular to the optical axis and/or the angle α=0°, as shown in FIG. 4.

Figure 7:
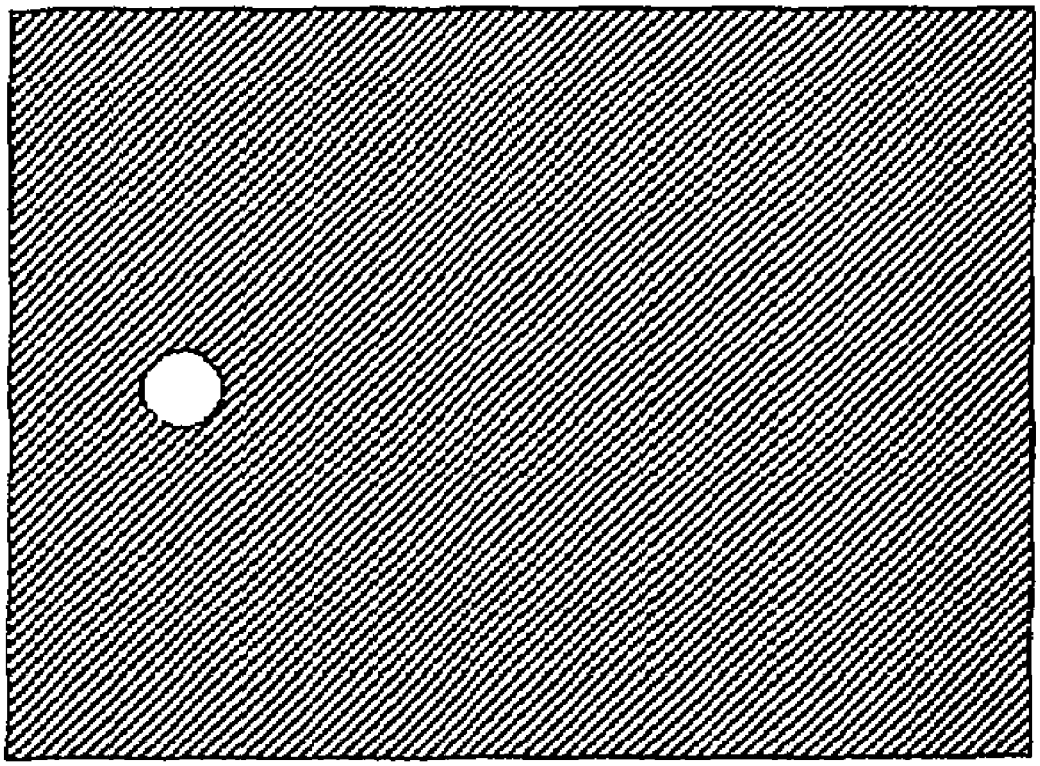
FIG. 7 shows the image of the screen position at an angle α≠0° to the reflecting surface viewed from the detector.

FIG. 7 schematically shows the example of the screen image on the detector when the mirror is inclined by an angle α≠0° in relation to the optical axis, as shown in FIG. 5. The displacement of the screen position may now be ascertained in relation to the starting position and/or reference position from FIG. 6 and the angle change, which is approximately proportional to the displacement of the screen position, may be determined automatically therefrom.

Figure 8:
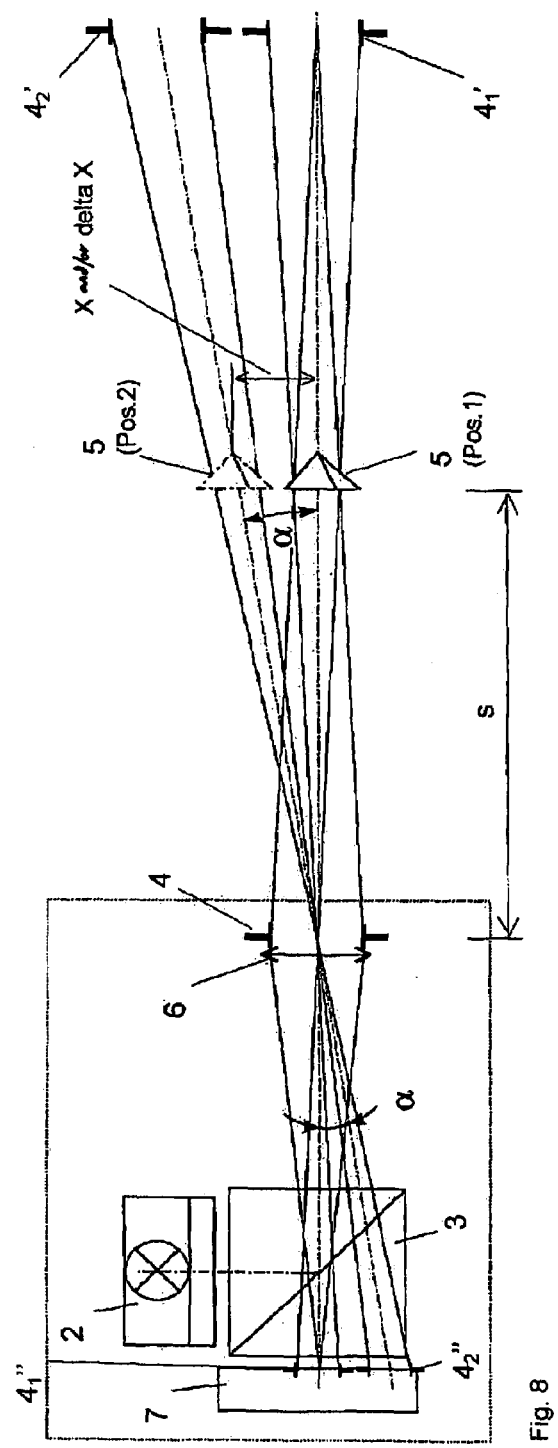
FIG. 8 shows the arrangement having a retroreflector as the reflecting element for measuring lateral displacements.

FIG. 8 schematically shows the arrangement having a reflecting element (5), which is implemented as a single-axis optical square or a double-axis retroreflector, with the aid of which one-dimensional or two-dimensional lateral displacements x and/or delta x may be ascertained.

The invention claimed is:

1. A method for contactless measurement of angles or angle changes on objects comprising:
   generating a beam bundle;
   transilluminating a screen using the beam bundle, the screen acting simultaneously as an aperture screen and a field screen and having an adjustable or variable screen opening in order to allow adaptation of the size of the screen image on a detector corresponding to a predefined measurement distance;
   imaging the transilluminated screen through an optical system on the detector surface after reflection on a distal reflecting element which is subjected to the angle changes to be measured;
   detecting the image of the screen on the detector surface;
   ascertaining the position of the screen image in relation to a reference position of the original screen image or to a reference point on the detector surface; and
   determining the measured value of the angle change α on the basis of the position displacement to the reference position and to the reference point respectively.

2. The method according to claim 1, wherein the beam bundle is generated using a light generator from the group consisting of planar radiator and light having corresponding beam density distributions or display illuminations having adjustable absorption patterns in the illumination plane in order to generate characteristic light density distributions.

3. The method according to claim 1, wherein a quasi-parallel or approximately quasi-parallel beam bundle is used in the step of transillumination.

4. The method according to claim 1, wherein the transillumination of the screen is performed by an additional optical system.

5. The method according to claim 4, wherein the additional optical system is positioned at an angle φ to the optical system.

6. The method according to claim 1, wherein in the step of imaging the screen, a telecentric beam path is used.

7. The method according to claim 1, wherein the reflecting element has a suitable diffraction structure.

8. The method according to claim 7, wherein the diffraction structure diffracts in one dimension and direction respectively.

9. The method according to claim 7, wherein the diffraction structure diffracts in two directions.

10. The method according to claim 9, wherein the diffraction structure has different grating constants in the two directions and therefore produces different angles of diffraction in the two directions.

11. The method according to claim 1, wherein the screen is designed in such a way that it has at least two openings positioned in a suitable way, whose geometry is known and which allow exact determination of the screen image size on the detector.

12. The method according to claim 11, wherein the imaging scale is determined via the determination of the screen image size and wherein the focal intercept and the measurement distance respectively may be determined via the known focal width of the optical system.

13. The method according to claim 1, wherein the reflecting element is implemented as a retroreflector.

14. The method according to claim 13, wherein the retroreflector is an optical square which is inclination-invariant in only one plane.

15. The method according to claim 13, wherein the retroreflector is a triple mirror or corner cube which is inclination-invariant in two planes.

16. The method according to claim 1, wherein lateral displacements may be measured via the angle measurement and the distance ascertained between the reflector and a device via the tangential relationship.

17. A measuring device for contactless measurement of angles or angle changes on objects, comprising:
a light generator adapted to generate characteristic light density distributions and produce a beam bundle;
a downstream screen, which is transilluminated by the beam bundle and acts simultaneously as an aperture screen and a field screen and has an adjustable or variable screen opening in order to allow adaptation of the size of the screen image on a detector in accordance with the predefined measurement distance;
a reflecting element downstream at a predefined measurement distance, which is subjected to the angle change α to be measured;
an optical system, which generates the screen image from the reflected beam bundle;
an optoelectronic detector, on which the screen image is projected; and,
a downstream electronic analysis unit, the analysis unit being set up to determine the distance of the position of the screen image from a prior reference position and from a reference point respectively, in order to obtain therefrom the measured value of the angle and the angle change respectively.

18. The measuring device according to claim 17, wherein the light generator is selected from the group of light generators consisting of a planar radiator having corresponding beam density distributions and display illuminations having adjustable absorption patterns in the illumination plane.

19. The measuring device according to claim 18, wherein to determine the position of the screen image, the analysis unit automatically ascertains the center point or the edge of the screen image on the basis of its brightness distribution.

20. The measuring device according to claim 18, wherein to determine the position of the screen image, the analysis unit automatically ascertains the center point of the screen image on the basis of its centroid.

21. The measuring device according to claim 17, wherein the optical system is adjustable in the direction of the optical axis in order to focus the screen image on the detector.

22. The measuring device according to claim 17, wherein the detector is adjustable in the direction of the optical axis in order to focus the screen image on the detector.

23. The measuring device according to claim 17, wherein the screen, the optical system, the reflecting element, and the detector are positioned on one axis and a beam splitter is positioned on this axis between the screen and the detector and the light generator emits the beam bundle for illuminating the screen into the beam splitter transversely to this axis.

24. The measuring device according to claim 17, wherein a monochromatic light source is provided as the light generator.

25. The measuring device according to claim 17, wherein a filter element is provided in the beam path, which filters out the interfering light from the surroundings.

26. The measuring device according to claim 17, wherein the light generator is a planar radiator having a light-scattering element.

27. The measuring device according to claim 26, wherein the light-scattering element is implemented as a scattering disk, diffuser, or opal disk.

28. The measuring device according to claim 17, wherein the reflecting element has a suitable diffraction structure.

29. The measuring device according to claim 28, wherein the diffraction structure diffracts in one dimension and direction respectively.

30. The measuring device according to claim 28, wherein the diffraction structure diffracts in two directions.

31. The measuring device according to claim 30, wherein the diffraction structure has different grating constants in the two directions and therefore produces different angles of diffraction in the two directions.

32. The measuring device according to claim 17, wherein the screen is designed in such a way that it has two or more openings positioned in a suitable way, whose geometries are known and which allow exact determination of the screen image size on the detector.

33. The measuring device according to claim 32, wherein an imaging scale is ascertained via the determination of the screen image size and wherein a focal intercept and a measurement distance respectively may be determined via a known focal width of the optical system.

34. The measuring device according to claim 17, wherein the reflecting element is implemented as a retroreflector.

35. The measuring device according to claim 34, wherein the retroreflector is an optical square which is inclination-invariant in only one plane.

36. The measuring device according to claim 34, wherein the retroreflector is a triple mirror or corner cube, which is inclination-invariant in two-planes.

37. The measuring device according to claim 34, wherein lateral displacements may be measured via the angle measurement and the distance ascertained between reflector and device via the tangential relationship.

* * * * *

UNITED STATES PATENT AND TRADEMARK OFFICE
CERTIFICATE OF CORRECTION

PATENT NO. : 7,298,468 B2 Page 1 of 1
APPLICATION NO. : 11/312257
DATED : November 20, 2007
INVENTOR(S) : Engelbert Hofbauer It is certified that error appears in the above-identified patent and that said Letters Patent is hereby corrected as shown below:

Col. 2, Line 29, "angle change a" should read --angle change α--.

Signed and Sealed this

Twenty-first Day of October, 2008

JON W. DUDAS
*Director of the United States Patent and Trademark Office*